US009130877B2

(12) United States Patent
Kobayashi et al.

(10) Patent No.: US 9,130,877 B2
(45) Date of Patent: Sep. 8, 2015

(54) PACKET RETRANSMISSION CONTROL APPARATUS AND PACKET RETRANSMISSION CONTROLLING METHOD

(75) Inventors: Noriaki Kobayashi, Tokyo (JP); Kiyohisa Ichino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/137,494

(22) Filed: Aug. 22, 2011

(65) Prior Publication Data

US 2011/0310797 A1    Dec. 22, 2011

Related U.S. Application Data

(63) Continuation of application No. PCT/JP2011/061188, filed on May 16, 2011.

(30) Foreign Application Priority Data

May 19, 2010   (JP) ................. 2010-115140

(51) Int. Cl.
*H04L 12/863* (2013.01)
*H04L 12/815* (2013.01)
(Continued)

(52) U.S. Cl.
CPC .......... *H04L 47/6215* (2013.01); *H04L 1/1887* (2013.01); *H04L 47/193* (2013.01); *H04L 1/1874* (2013.01); *H04L 47/2408* (2013.01); *H04L 47/2441* (2013.01)

(58) Field of Classification Search
USPC .................................. 370/389, 328; 709/230
See application file for complete search history.

(56) References Cited

U.S. PATENT DOCUMENTS 6,618,397 B1 * 9/2003 Huang .................... 370/474
7,315,898 B2 * 1/2008 Kohno .................... 709/230
(Continued)

FOREIGN PATENT DOCUMENTS

JP    2001-127830 A    5/2001
JP    2004-241952 A    8/2004
(Continued)

OTHER PUBLICATIONS

Toru Takamichi, et al. , "Ultra-High Speed MAC Technology for Terabit-Class LAN" (Institute of Electronics, Information and Communication Engineers, Communication Society Conference, 2008).
(Continued)

*Primary Examiner* — Kevin C Harper
*Assistant Examiner* — Derrick V Rose
(74) *Attorney, Agent, or Firm* — McGinn IP Law Group, PLLC

(57) ABSTRACT

The present invention provides a packet retransmission control technique in which the communication performance can be improved in a state that the load of a network is high. The packet retransmission control apparatus includes a priority determining section configured to set a packet kind to each of transmission packets to indicate a kind of the transmission packet, and determine a priority level based on the packet kind to indicate an transmission order of the transmission packets; a packet buffer comprising a plurality of queues respectively assigned with priority levels, and configure to store the transmission packet in one of the plurality of queues which is determined based on the priority level of the transmission packet; and an arbitrating section configured to output the transmission packets from one assigned with the highest priority level of the plurality of queues to a lower layer in order of higher priority level.

8 Claims, 16 Drawing Sheets

(51) Int. Cl.
 *H04L 12/801* (2013.01)
 *H04L 1/18* (2006.01)
 *H04L 12/851* (2013.01)

(56) References Cited

U.S. PATENT DOCUMENTS

| | | | | |
|---|---|---|---|---|
| 7,814,219 | B2 * | 10/2010 | Connor | 709/230 |
| 8,261,147 | B2 * | 9/2012 | Fukushima et al. | 714/748 |
| 2003/0235194 | A1 * | 12/2003 | Morrison | 370/389 |
| 2006/0062193 | A1 * | 3/2006 | Choi et al. | 370/342 |
| 2010/0067538 | A1 | 3/2010 | Zhang et al. | |

FOREIGN PATENT DOCUMENTS

| | | | |
|---|---|---|---|
| JP | 2005-223673 | A | 8/2005 |
| JP | 2006-245887 | A | 9/2006 |
| JP | 2006-295847 | A | 10/2006 |
| JP | 2007-228148 | A | 9/2007 |
| JP | 2008-54070 | A | 3/2008 |
| JP | 2010-507938 | A | 3/2010 |

OTHER PUBLICATIONS

International Search Report (ISR) (PCT Form PCT/ISA/210) dated Aug. 16, 2011, with partial English translation.

\* cited by examiner

Fig. 6

PRIORITY TABLE 71

| PACKET PRIORITY 80 | PACKET KIND 81 | RETRANSMISSION COUNT (MAX: 10) |
|---|---|---|
| 1 (HIGHEST) | ACKNOWLEDGE PACKET 31 | - |
| 2 | ENCAPSULATED PACKET 30 | 10 |
| 3 | ENCAPSULATED PACKET 30 | 9 |
| ⋮ | ⋮ | ⋮ |
| 11 | ENCAPSULATED PACKET 30 | 1 |
| 12 | ENCAPSULATED PACKET 30 | 0 |
| 13 (LOWEST) | RETRANSMISSION NON-APPLICATION PACKET 14 | - |

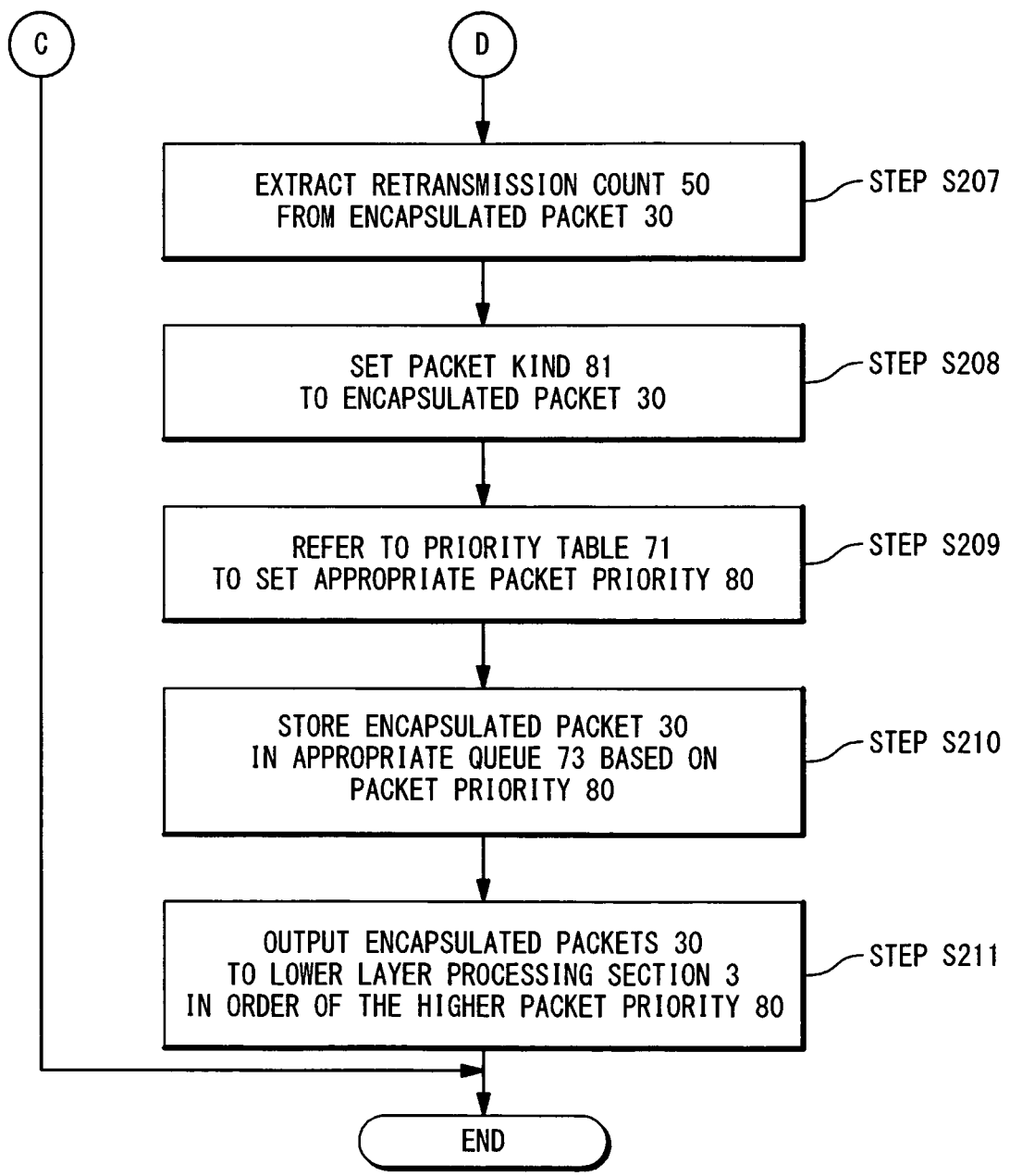

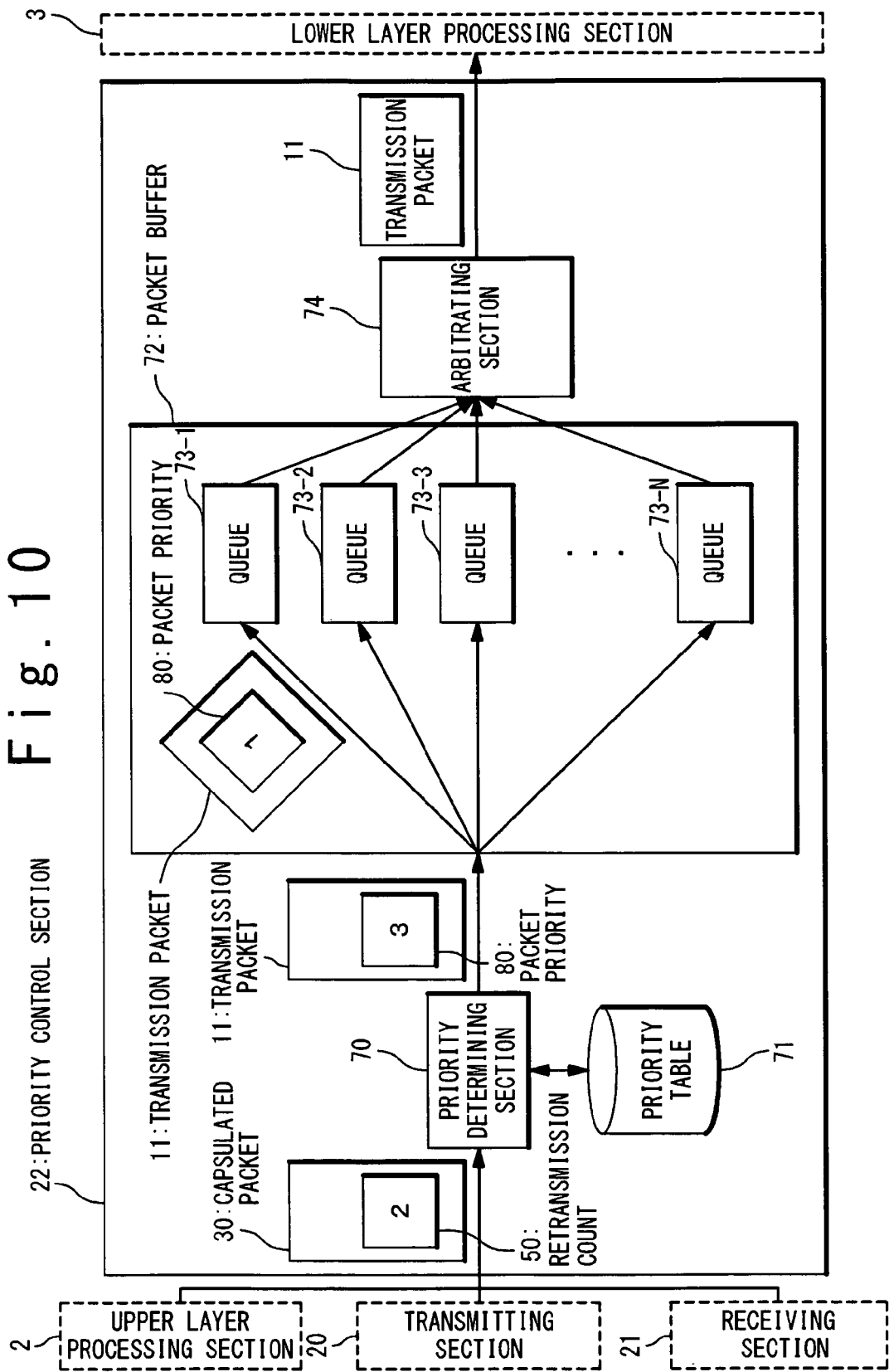

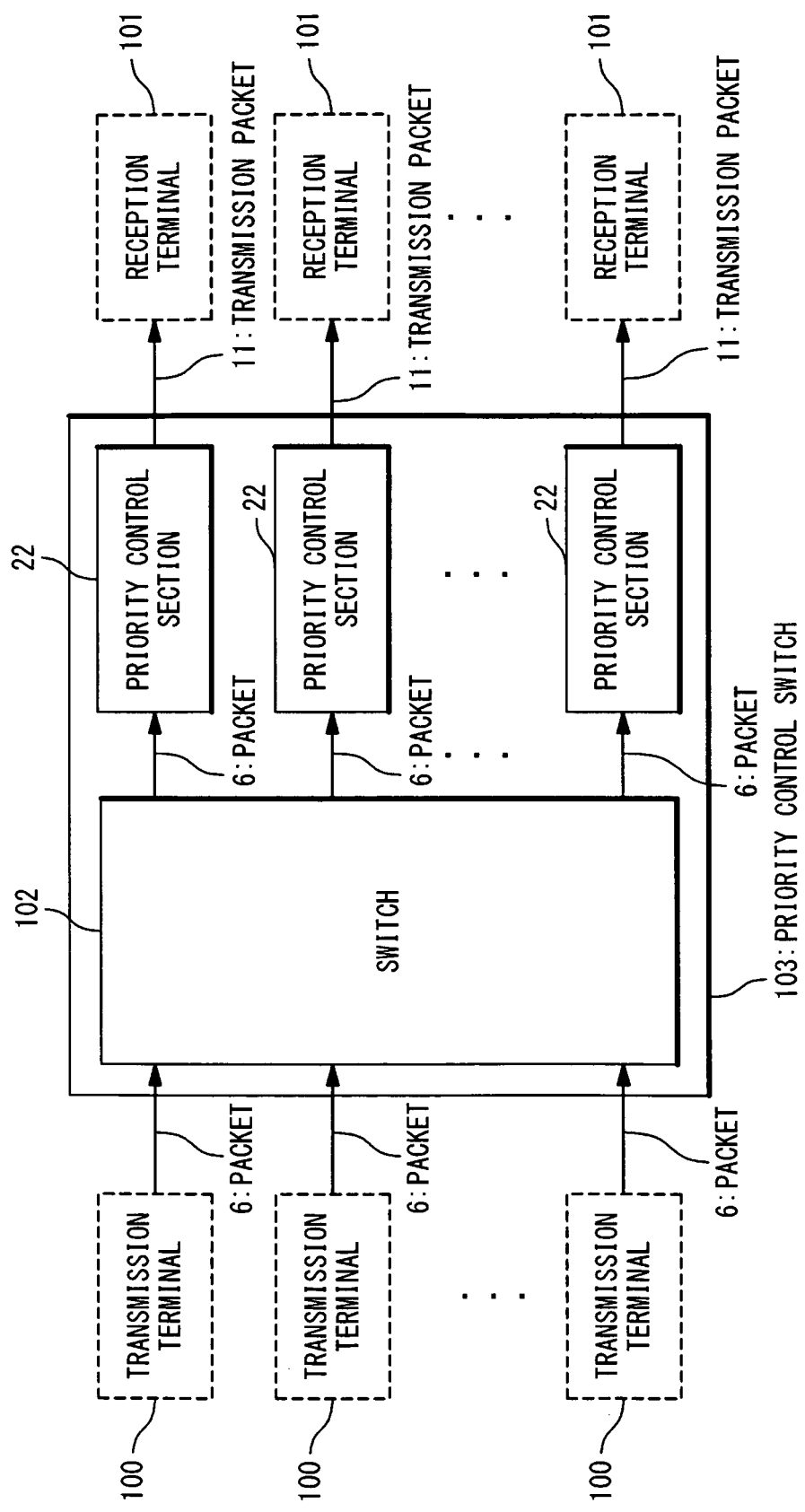

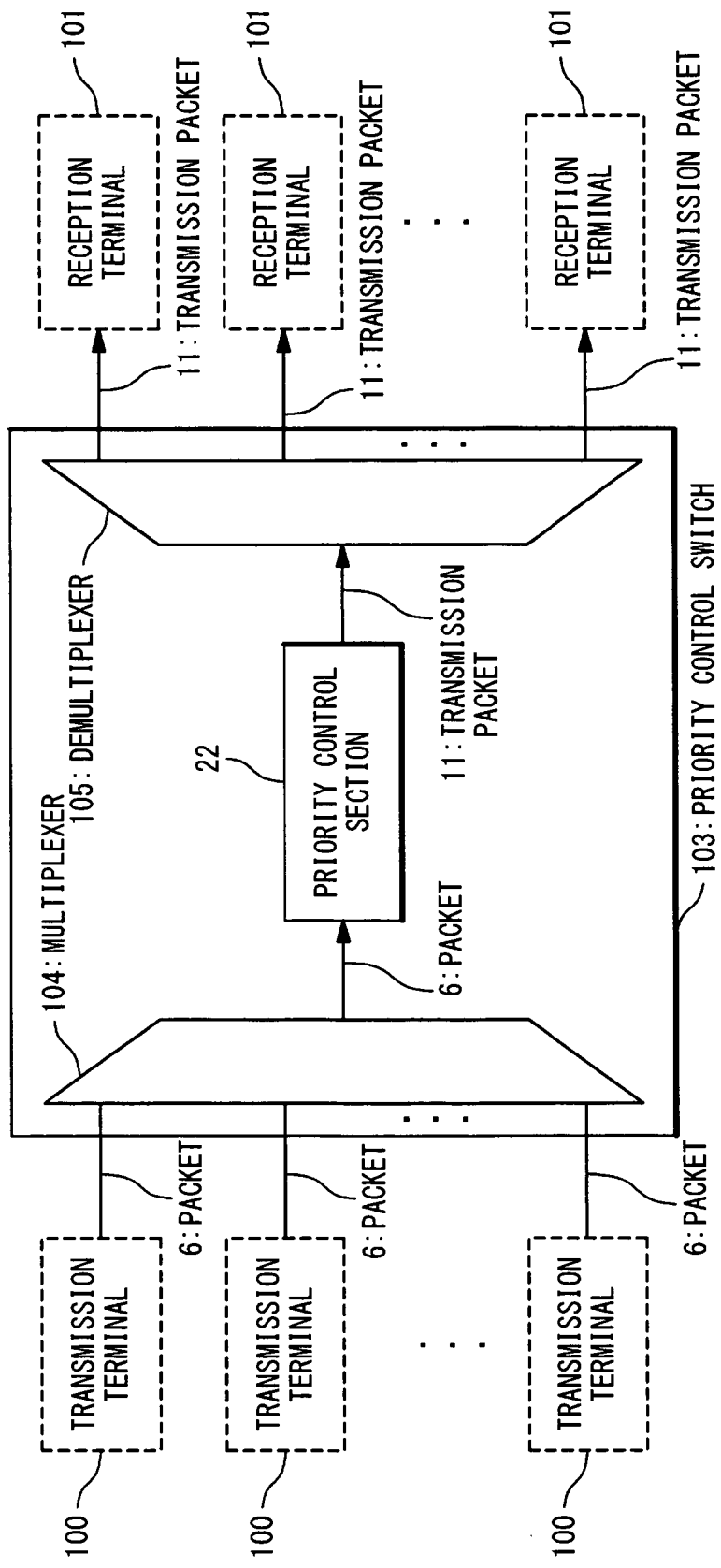

PACKET RETRANSMISSION CONTROL APPARATUS AND PACKET RETRANSMISSION CONTROLLING METHOD

CROSS-REFERENCE TO RELATED APPLICATION

This application is a continuation of International Application No. PCT/JP2011/061188, filed on May 16, 2011.

TECHNICAL FIELD

The present invention is related to a packet retransmission control in a packet transmission.

BACKGROUND ARTS

In a packet transmission network, there is possibility that the discard and destruction of a communication packet occur. This is caused of the occurrence of congestion in a network router and a network switch which transfers packets, the lowering of signal reception sensitivity, external electromagnetic noise and so on. Generally, the disappearance of the communication packet due to the discard and destruction is detected by a protocol on an application layer or a transport layer. In such a protocol, the retransmission of the disappeared packet is carried out and the integrity of data to be transmitted is guaranteed.

Specifically, a transmitting unit transmits a communication packet to a receiving unit, and the receiving unit replies an acknowledge (ACK) packet to the transmitting unit in response to the reception of the communication packet. The transmitting unit can recognize from the acknowledge packet that the transmitted packet reached the receiving unit safely. On the other hand, when the packet disappears on the network between the transmitting unit and the receiving unit, the transmitting unit never receives the acknowledge packet to the disappeared packet. When not receiving the acknowledge packet within a determined time after the communication packet is transmitted, the transmitting unit retransmits the transmitted packet to the receiving unit. It should be noted that the above predetermined time is called a "retransmission time-out (RTO) time". Also, the transmitting unit which performs such a packet retransmission control is provided with a storage region to store a communication packet temporarily until receiving the acknowledge packet. This storage region is hereinafter referred to a "retransmission buffer".

TCP (transmission control protocol) used in the Internet is a typical transport layer protocol, which performs such a packet retransmission control.

The technique which relates to such a packet retransmission control is disclosed in Non-Patent Literature 1. According to Non-Patent Literature 1, in a MAC (media access control) layer lower than the transport layer, a packet retransmission control is implemented. The reason is as follows.

As an example, a network is supposed, in which the round-trip time (RTT) is very short, like a network in a data center. In such a network, by reducing the retransmission time-out time to a time in a microsecond level, a waiting time until the packet retransmission is reduced, and the communication performance can be improved. However, because the TCP is generally implemented in an OS (operating system), it is difficult to reduce the retransmission time-out time in the TCP to the microsecond level. For example, the precision of unit time (jiffies) in Linux is at most several milliseconds, and it is not possible to use for time measurement in the microsecond level. Therefore, in Non-Patent Literature 1, by performing a packet retransmission control in the MAC layer of a lower layer than the OS, the retransmission time-out time is reduced to the microsecond level so as to solve the above problem.

In this way, in the packet retransmission control, when the retransmission packet and the acknowledge packet are discarded due to network congestion and so on, further retransmission of the retransmission packet and the acknowledge packet is carried out. The repeat of retransmission, i.e. the multiple retransmissions spends a transmission band of the network, to cause the degradation of communication performance. To restrain the multiple the retransmission, it is desirable to prevent the discard of the retransmission packet and the acknowledge packet as far as possible. For the purpose, it is required that the retransmission packet and the acknowledge packet are transmitted with a priority, compared with a packet not yet retransmitted (hereinafter, to be referred to a first time packet) in the network.

However, in the packet retransmission controlling technique disclosed in Non-Patent Literature 1, the priority control is not carried out among three kinds of packets of the first time packet, the retransmission packet and the acknowledge packet. Therefore, the probabilities are equal that the three kinds of packets are discarded in the network. As a result, the packet retransmission controlling technique in Non-Patent Literature 1 causes multiple retransmissions easily in a high load state of the network, and communication performance is easily reduced.

It should be noted that the following Patent Literatures 1 to 4 describe the packet retransmission control.

In a packet transferring control system in Patent Literature 1, a first section is connected between a communication network and a terminal equipment, to measure a transfer quantity of packets which are transferred to the terminal equipment from the communication network within a constant time, and determines a priority of the packet based on the comparison of the measured transfer quantity and a predetermined value. A second section is connected with the terminal equipment via the communication network, to store the priority determined in the first section and the destination of the packet, and to assign the above priority to the packet to be transferred to the destination. A third section is installed in the communication network, and temporarily stores the packet outputted from the second section in one of storage units which are different according to the priorities, and the transfers and discard of the packet stored temporarily is controlled according to the priority. The third section separates and temporarily stores the packets of the different kinds assigned with the same priority into difference storage units, respectively.

In a packet switching apparatus described in Patent Literature 2, a transfer control section determines a priority of a packet based on data contained in a packet received by the packet switching apparatus. A packet search control section searches a destination of the packet based on data which is contained in the packet received by the packet switching apparatus. A unit control section carries out packet processing on the packet that is the destination searched by the packet search control section is its node itself. A packet transferring section transfers the packet to the unit control section based on the priority determined by the transfer control section. The transfer control section changes the priority of the packet according to the arrival frequency and the transmission frequency of the packet.

In a retransmission control method in a transmission station of a radio communication system described in Patent Literature 3, a sequence number is given to each data inputted from an upper layer (hereinafter, to be referred to as the upper layer) than a radio layer and is extracted. The input record of the extracted sequence number is managed. Based on the input record, the read order of transmission data from a retransmission buffer is controlled so as to record said input data for ARQ (automatic repeat request) processing in the radio layer.

In a reception packet processing method in Patent Literature 4, data is partially extracted from the received packet, and digest data is generated by carrying out an operation using a hash function to the extracted data. The digest data is compared with a plurality of packet selection data previously given from a host computer and the packet selection data matching to the digest data is detected. The processing priority of the packet is determined based on the packet selection data. One memory is selected from a plurality of memories which are previously prepared, according to the processing priority determined and the packet is stored in the selected memory. When there is no packet selection data matching to the digest data in the comparison, the packet is discarded.

Citation List:

[Patent Literature]

[Patent Literature 1]: JP 2004-241952A
[Patent Literature 2]: JP 2008-054070A
[Patent Literature 3]: JP 2006-295847A
[Patent Literature 4]: JP 2005-223673A

[Non-Patent Literature]

[Non-Patent Literature 1]: "Ultra-High Speed MAC Technology for Terabit-Class LAN" (Institute of Electronics, Information and Communication Engineers, Communication Society Conference, 2008) by Toru Takamichi, et al.

SUMMARY OF THE INVENTION

One subject matter of the present invention is to provide a packet retransmission control technique in which a communication performance can be improved in a state that the network load is high.

One aspect of the present invention, a packet retransmission control apparatus is provided. The packet retransmission control apparatus includes a priority determining section configured to set a packet kind to each of transmission packets to indicate a kind of the transmission packet, and determine a priority level based on said packet kind to indicate an transmission order of the transmission packets; a packet buffer comprising a plurality of queues respectively assigned with priority levels, and configure to store the transmission packet in one of said plurality of queues which is determined based on said priority level of the transmission packet; and an arbitrating section configured to output the transmission packets from one assigned with the highest priority level of said plurality of queues to a lower layer in order of higher priority level.

In another aspect of the present invention, a packet retransmission controlling method is provided. The packet retransmission controlling method includes: a step of setting a packet kind to indicate a kind of a transmission packet; a step of determining a priority level based on said packet kind to indicate a transmission order of packets; a step of storing the transmission packet in one of a plurality of queues which is determined based on said priority level of the transmission packet, wherein said plurality of queues are respectively assigned with priority levels; and a step of outputting the transmission packets from one assigned with the highest priority level of said plurality of queues to a lower layer in order of higher priority level.

In further another aspect of the present invention, a packet retransmission control program is provided. The packet retransmission control program makes a computer realize the above-mentioned packet retransmission controlling method.

According to the present invention, restraining the generation of the multiple the retransmission by the discard of the retransmission packet and the ACK packet it becomes possible for the load of the network to improve communication efficiency in the high condition, too.

BRIEF DESCRIPTION OF THE DRAWINGS

FIG. 6 is a diagram showing configuration of the priority table in the first exemplary embodiment of the present invention;

FIG. 8B is the other part of the flow chart showing the retransmission operation of the retransmission application packet by the packet retransmission control apparatus in the first exemplary embodiment of the present invention;

FIG. 10 is a diagram showing a specific example of a priority control processing by a priority control section in the first exemplary embodiment of the present invention;

FIG. 11 is a diagram showing a configuration example when the priority control section according to the first exemplary embodiment of the present invention is applied to a network relay unit;

FIG. 13 is a diagram showing a configuration example of a switch when the priority control section according to the first exemplary embodiment of the present invention is applied to a switch.

DESCRIPTION OF EXEMPLARY EMBODIMENTS

Hereinafter, a packet retransmission control apparatus according to the present invention will be described in detail with reference to the attached drawings.

The packet retransmission control apparatus of the present invention performs a priority control in accordance with a packet kind of a communication packet to be transmitted. In the present invention, the packets are separated into three kinds of the packets: a retransmission application packet, a retransmission non-application packet, and an acknowledge (ACK) packet. The retransmission application packet is a packet to which a retransmission control is applied. The retransmission non-application packet is a packet to which the retransmission control is not applied. When the retransmission application packet is received, the acknowledge packet is transmitted to a transmitting unit which has transmitted the packet.

The packet retransmission control apparatus assigns higher priorities for the priority control to the packets in order of the acknowledge packet, the retransmission application packet, and the retransmission non-application packet. Also, in case of retransmission of the retransmission application packet, the packet retransmission control apparatus assigns a higher priority level to the retransmission application packet as a retransmission count of the retransmission application packet is more, and performs the priority control on the retransmission application packet. Therefore, the packet retransmission control apparatus transmits the acknowledge packet with a higher priority level than the retransmission application packet and the retransmission non-application packet. Also, the retransmission application packet is assigned with a higher priority level than the retransmission non-application packet. Also, of the retransmission application packets, the packet retransmission control apparatus can primarily transmit the retransmission application packet with a higher retransmission count. Thus, the packet retransmission control apparatus restrains the occurrence of the multiple retransmission by the discard of the retransmission application packet and the acknowledge packet, and can improve communication efficiency even in the condition of a high load of the network.

Figure 1:
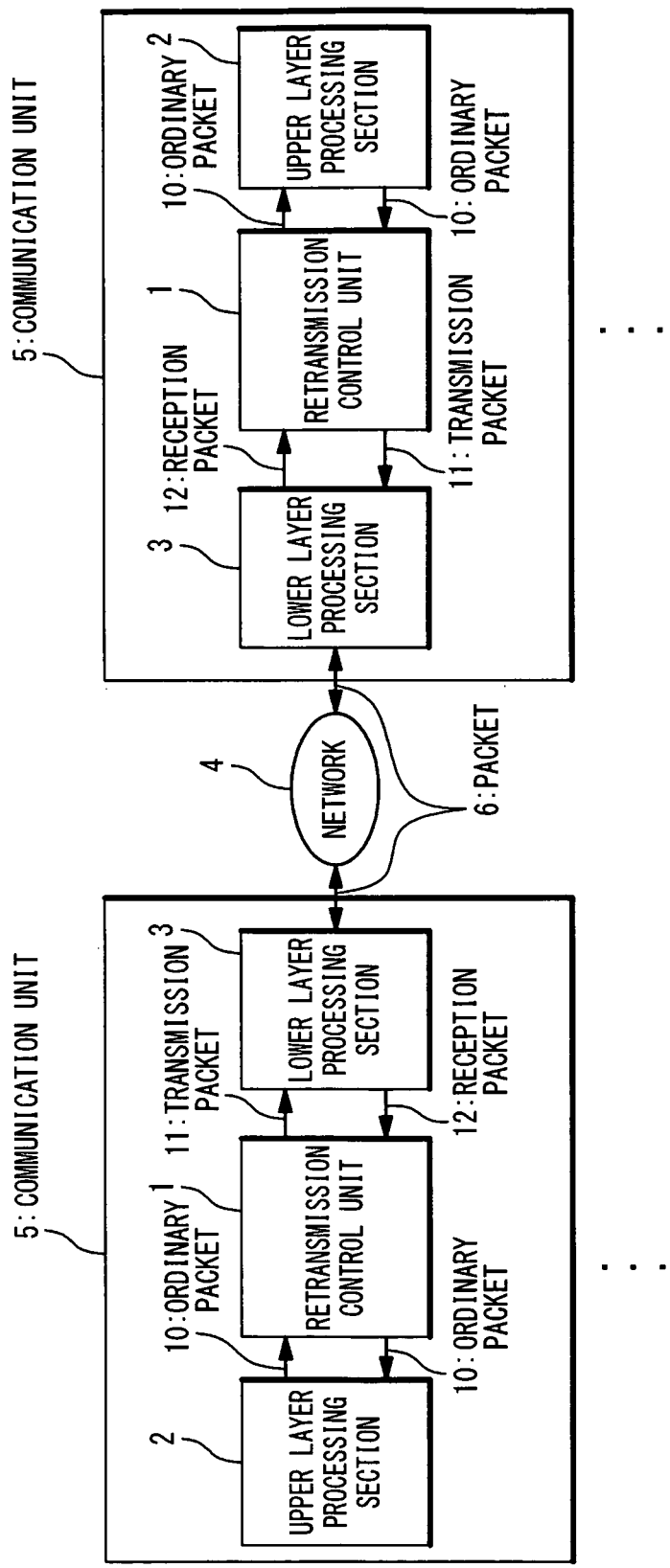
FIG. 1 is a diagram showing a communication network system according to a first exemplary embodiment of the present invention.

First, the configuration of the packet retransmission control apparatus according to a first exemplary embodiment of the present invention will be described. FIG. 1 is a diagram showing the configuration of a communication network system applied with the packet retransmission control apparatus according to the first exemplary embodiment of the present invention. The communication network system is provided with a plurality of communication units 5 and a network 4. The plurality of communication units 5 are connected to each other through the network 4.

First, the network 4 transfers a packet 6, which is transmitted and received among the plurality of communication units 5. In the network 4, a plurality of transmission units such as a network router and a network switch are connected to each other by transmission lines. The network 4 transmits the packet 6 to an appropriate address along a predetermined transmission route or a transmission route which is determined based on an address contained in the packet 6. In the network 4, there is possibility that the packet 6 on transfer disappears according to electromagnetic noise, traffic congestion and so on.

Next, each of the plurality of communication units 5 transmits and receives the packet 6 to and from another communication unit 5 through the network 4. Each of the communication units 5 is provided with a retransmission control unit 1, an upper layer processing section 2 and a lower layer processing section 3.

The upper layer processing section 2 performs processing in a transport layer or an application layer. A communications protocol on the transport layer is exemplified by TCP (transmission control protocol) and UDP (user datagram protocol). A communications protocol on the application layer is exemplified by HTTP (hyper text transfer protocol) and SMTP (simple mail transfer protocol). In the present exemplary embodiment, the packet 6 which is generated or terminated by the upper layer processing section 2 is referred to as an ordinary packet 10 to distinguish the other packets 6. The ordinary packets 10 contain a retransmission application packet and a retransmission non-application packet in the present exemplary embodiment.

Next, the retransmission control unit 1 receives a communication packet 10 from the upper layer processing section 2, and performs the retransmission control and the priority control, to output to the lower layer processing section 3 as a transmission packet 11. Also, the retransmission control unit 1 receives the reception packet 12 from the lower layer processing section 3, and if the reception packet 12 is an acknowledge packet, terminates the acknowledge packet. Also, if the reception packet 12 contains a retransmission application packet, the retransmission control unit 1 outputs it to the upper layer processing section 2, generates an acknowledge packet to reply to a transmission side.

Next, the lower layer processing section 3 performs processing of a physical layer and a link layer. The physical layer and the link layer follow the standard of the Ethernet (registered trademark). The lower layer processing section 3 transmits the transmission packet 11 which is transferred from the retransmission control unit 1, to the network 4 according to a predetermined procedure. Also, the lower layer processing section 3 outputs the packet 12 which is received from the network 4, to the retransmission control unit 1.

Figure 2:
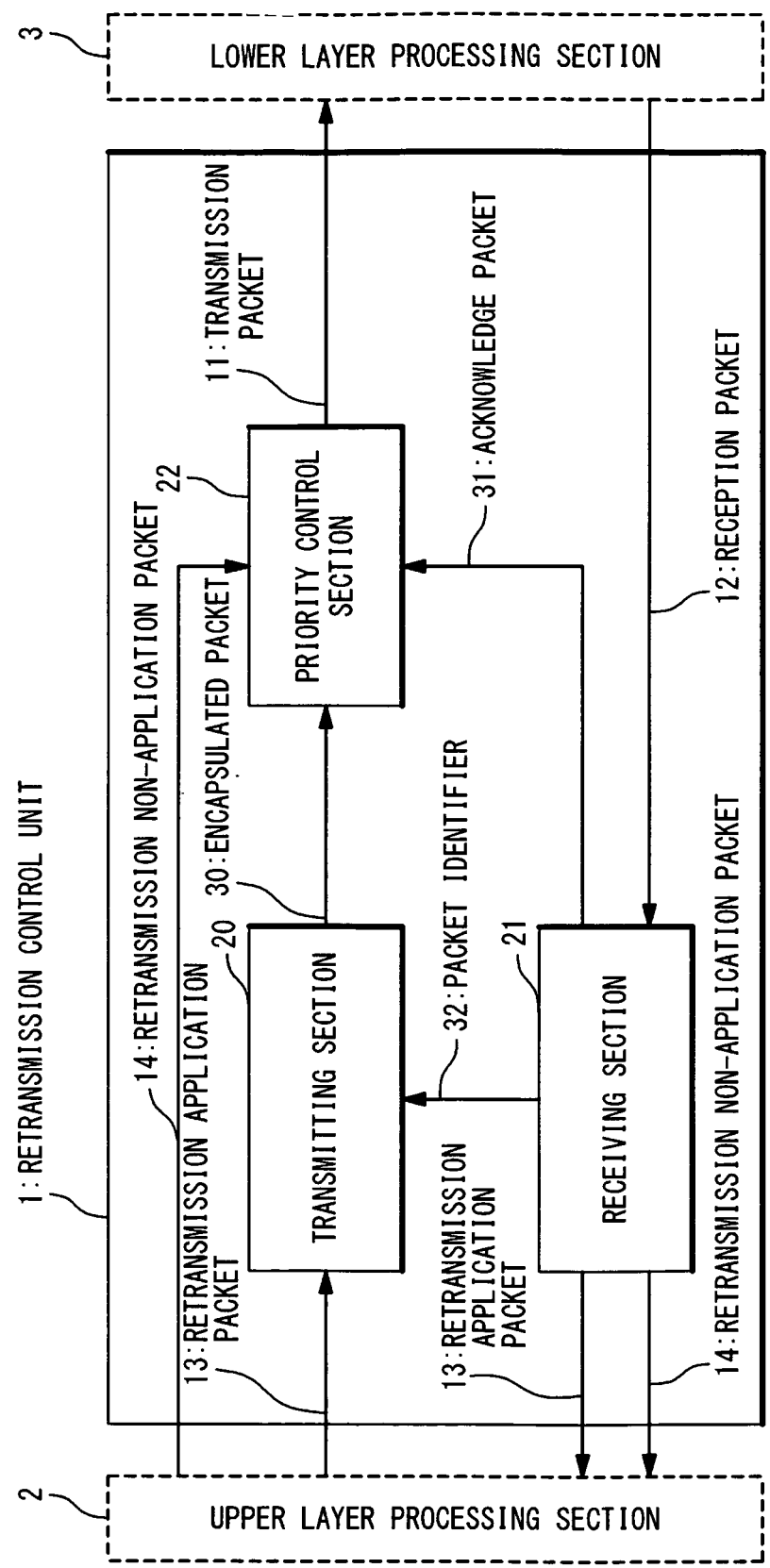
FIG. 2 is a diagram showing the configuration of a retransmission control apparatus according to the first exemplary embodiment of the present invention.

Next, the configuration of the retransmission control unit 1 will be described in detail. FIG. 2 is a diagram showing the configuration of the retransmission control unit 1 in the present exemplary embodiment. The retransmission control unit 1 in the present exemplary embodiment is provided with a transmitting section 20, a receiving section 21 and a priority control section 22. It should be noted that the above-mentioned retransmission control unit 1 may be realized in hardware or may be realized in software. Or, it may be realized in a combination of the hardware and the software.

The transmitting section 20 receives the retransmission application packet 13 as the ordinary packet 10 from the upper layer processing section 2. The transmitting section 20 generates an encapsulated packet 30 from the retransmission application packet 13, and outputs the encapsulated packet 30 to the priority control section 22. The encapsulated packet 30 is the packet 6 in which the information necessary for the retransmission control is given to the retransmission application packet 13.

Also, the transmitting section 20 receives a packet identifier 32 of the reception packet 12 from the receiving section 21. When not receiving the packet identifier 32 corresponding to an already transmitted encapsulated packet 30 from the receiving section 21 until the retransmission time-out, the transmitting section 20 retransmits the encapsulated packet 30.

Next, the receiving section 21 receives the reception packet 12 from the lower layer processing section 3. When the reception packet 12 is the encapsulated packet 30, the receiving section 21 extracts a retransmission application packet 13 and a packet identifier 32 from the encapsulated packet 30 as the ordinary packet 10. The receiving section 21 outputs the retransmission application packet 13 to the upper layer processing section 2. At the same time, the receiving section 21 generates the acknowledge packet 31 to the retransmission application packet 13 based on the extracted packet identifier 32, and outputs the acknowledge packet 31 to the priority control section 22. The acknowledge packet 31 is generated or terminated by the retransmission control unit 1.

Also, when the reception packet 12 supplied from the lower layer processing section 3 is the acknowledge packet 31, the receiving section 21 extracts a packet identifier 32 from the acknowledge packet 31 and terminates the acknowledge packet 31. The receiving section 21 outputs the extracted packet identifier 32 to the transmitting section 20. Moreover, when the reception packet 12 received from the lower layer processing section 3 is the retransmission non-application packet 14, the receiving section 21 outputs the retransmission non-application packet 14 to the upper layer processing section 2.

Next, the priority control section 22 processes a priority control. The priority control section 22 receives the retransmission non-application packet 14 from the upper layer processing section 2, receives the encapsulated packet 30 from the transmitting section 20, and also receives the acknowledge packet 31 from the receiving section 21. The priority control section 22 sets a packet priority based on the packet kinds of these packets and a retransmission count which is contained in the encapsulated packet 30. The priority control section 22 outputs each packet to the lower layer processing section 3 in order of the higher packet priority according to the packet priority levels which are set to the packets.

Here, when the encapsulated packet 30 contains the same data, the transmitting section 20 needs not to add the data. Thus, the packet length of the encapsulated packet 30 can be reduced. For example, the retransmission count is managed by the retransmission control unit 1. Also, when the retransmission count is contained in the encapsulated packet 30, it is not necessary to add because the retransmission count of the encapsulated packet 30 is redundant. Also, the retransmission processing may be performed without using the encapsulated packet 30, by omitting such data.

Figure 3:
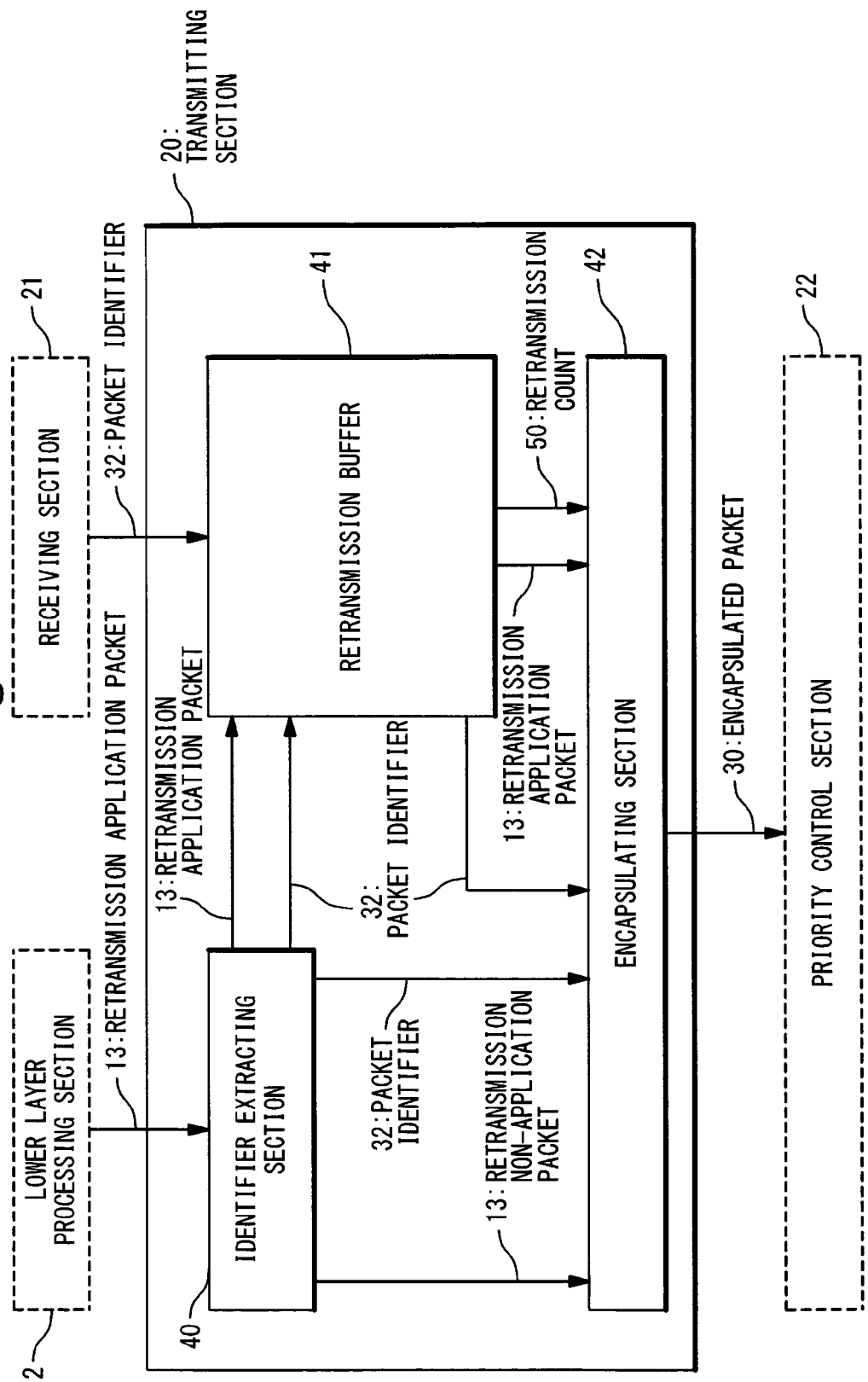
FIG. 3 is a diagram showing the configuration of a transmitting section in the first exemplary embodiment of the present invention.

Next, the configuration of the transmitting section 20 will be described in detail. FIG. 3 is a diagram showing the configuration of the transmitting section 20 in the present exemplary embodiment. The transmitting section 20 in the present exemplary embodiment is provided with an identifier extracting section 40, a retransmission buffer 41 and an encapsulating section 42.

The identifier extracting section 40 receives the retransmission application packet 13 from the upper layer processing section 2. The identifier extracting section 40 extracts the packet identifier 32 from the retransmission application packet 13, and outputs the packet identifier 32 and the retransmission application packet 13 to the retransmission buffer 41 and the encapsulating section 30.

Next, the retransmission buffer 41 is a queue of a FIFO (first-in and first-out) type which stores the queue entries 60.

Figure 4:
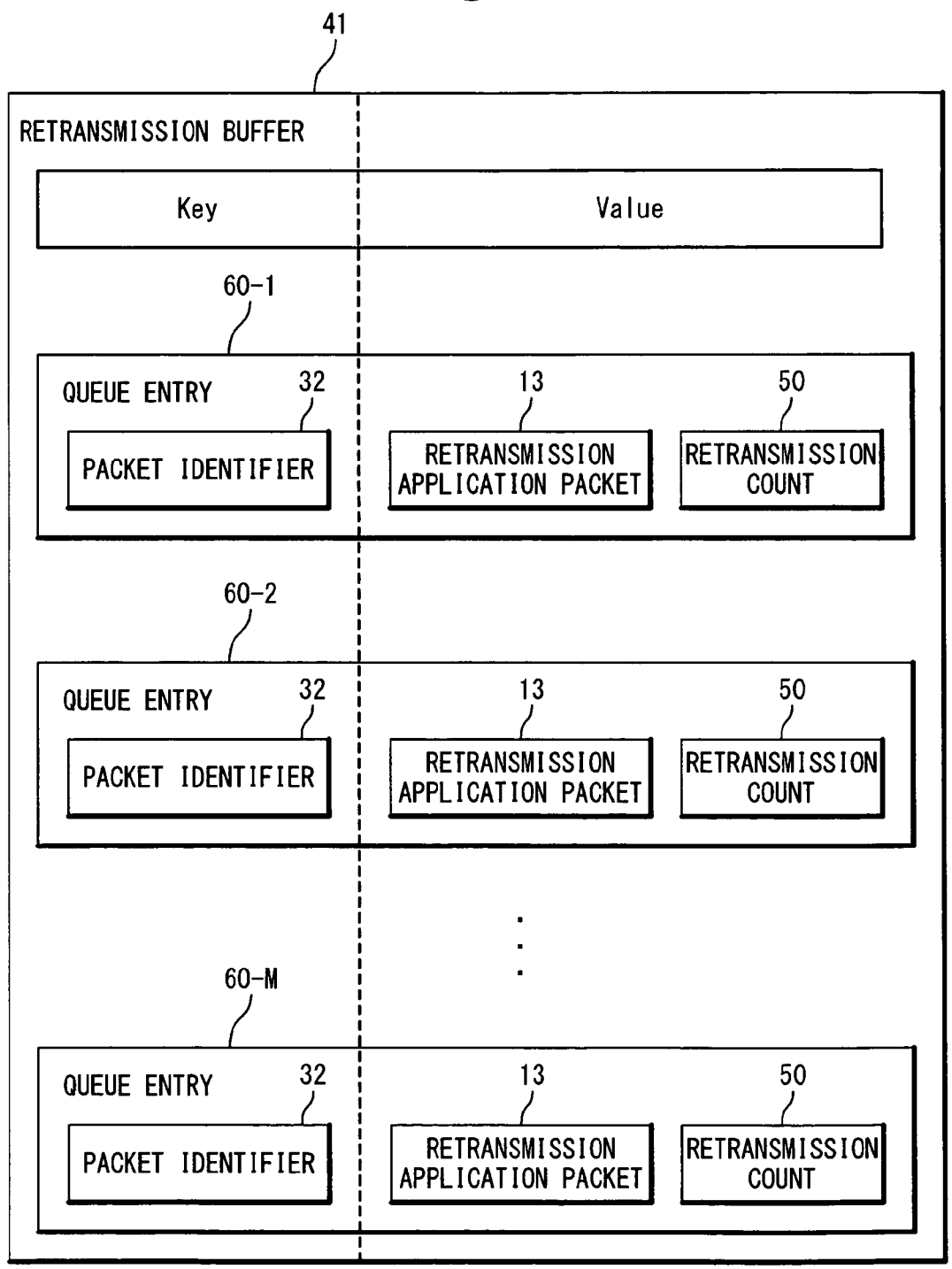
FIG. 4 is a diagram showing the configuration of a retransmission buffer in the first exemplary embodiment of the present invention.

FIG. 4 is a diagram showing the configuration of the retransmission buffer 41 in the present exemplary embodiment. The queue entries 60-1 to 60-*m* are stored in the retransmission buffer 41 of FIG. 4. However, hereinafter, when not especially specifying, a description is made as the queue entry 60. In the retransmission buffer 41 of FIG. 4, the queue entry 60-1 at the head is the oldest and the queue entry 60-*m* at the end is the newest. The queue entry 60 is received from the identifier extracting section 40. The queue entry 60 contains the packet identifier 32, the retransmission application packet 13 which contains a pay load, and the retransmission count 50 of the retransmission application packet 13, and an elapsed time (not illustrating) from storage in the retransmission buffer 41. The retransmission count 50 is a value indicating the number of times of retransmission of the encapsulated packet 30 which contains the retransmission application packet 13 contained in the queue entry 60. A predetermined upper limit L (L is a natural number) is determined to the retransmission count 50. Also, an original value of the retransmission count 50 is "1".

The encapsulating section 42 generates the encapsulated packet 30 based on the retransmission application packet 13 outputted from the identifier extracting section 40 or the retransmission buffer 41, the packet identifier 32 and the retransmission count and outputs the generated encapsulated packet 30 to the priority control section 22.

When the elapsed time of the queue entry 60 after being stored in the retransmission buffer 41 exceeds the retransmission time-out time, the transmitting section 20 processes the retransmission of the retransmission application packet as follows.

The transmitting section 20 outputs the retransmission application packet 13, the packet identifier 32, and the retransmission count 50 in the queue entry 60 to the encapsulating section 42. After that, the transmitting section 20 updates the elapsed time for every constant time, and determines whether or not the elapsed time exceeds the retransmission time-out time. When the elapsed time exceeds the retransmission time-out time, the transmitting section 20 determines whether or not the retransmission count 50 reaches the predetermined upper limit L. When the retransmission count 50 reaches the upper limit L, the transmitting section 20 deletes the queue entry 60 from the retransmission buffer 41.

When the retransmission count 50 of the retransmission application packet 13 outputted to the encapsulating section 42 does not reach the upper limit L, the transmitting section 20 outputs the retransmission application packet 13, the packet identifier 32 and the retransmission count 50 to the encapsulating section 42. The encapsulating section 30 generates the encapsulated packet 30 from the retransmission application packet 13, the packet identifier 32 and the retransmission count 50. After that, the transmitting section 20 increases the retransmission count 50 of the queue entry 60 by "1". Also, after resetting the elapsed time of the queue entry 60, the transmitting section 20 moves the queue entry 60 to the end in the retransmission buffer 41. After that, the transmitting section 20 waits for the elapse of the retransmission time-out time to the queue entry 60 again.

Also, when receiving the packet identifier 32 from the receiving section 21, the transmitting section 20 confirms whether or not the queue entry 60 having the same packet identifier 32 as the received packet identifier 32 exists. When the queue entry 60 having the same packet identifier 32 as the received packet identifier 32 exists, the transmitting section 20 deletes the queue entry 60 from the retransmission buffer 41.

Figure 5:
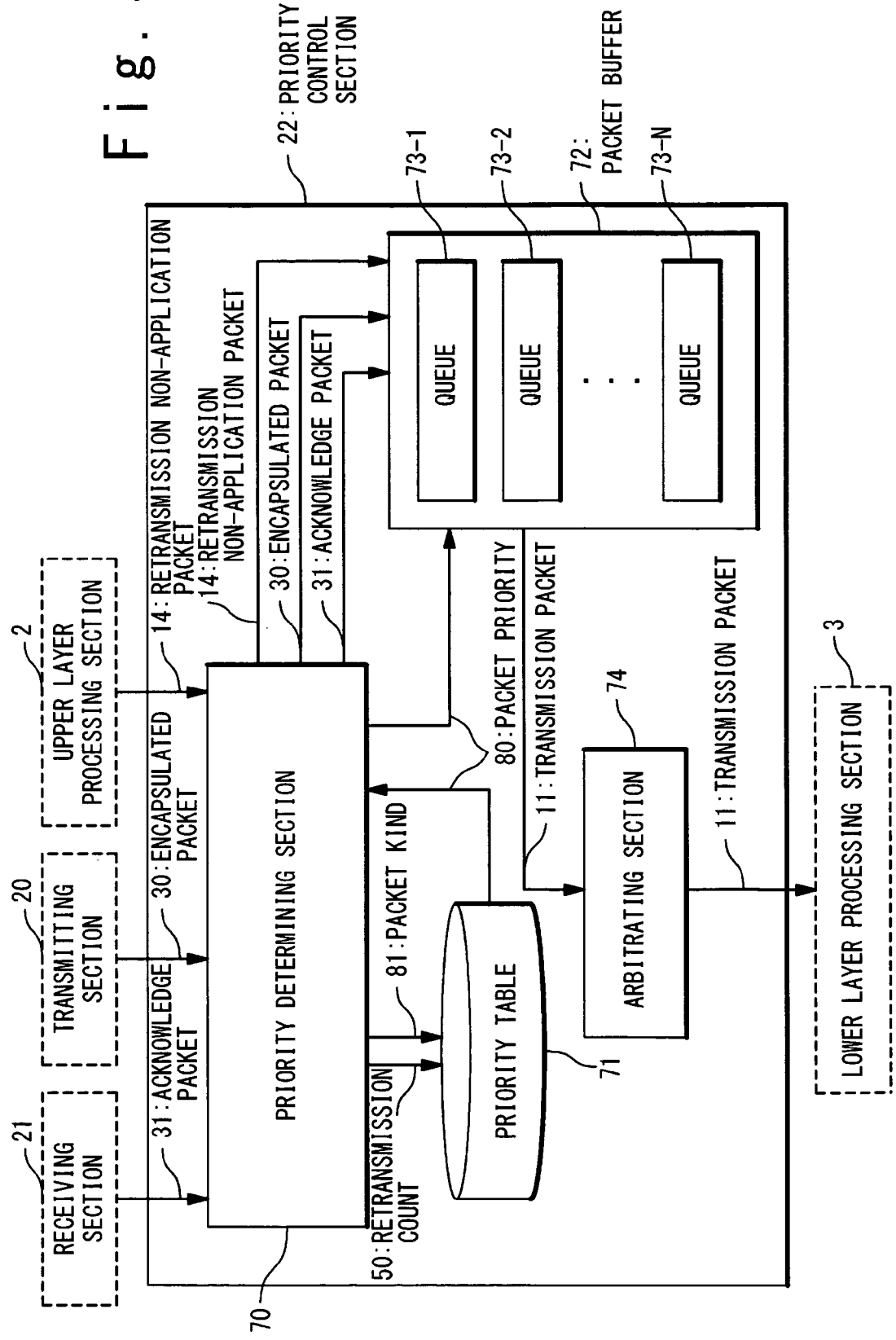
FIG. 5 is a diagram showing the configuration of a priority control section in the first exemplary embodiment of the present invention.

Next, the configuration of the priority control section 22 will be described in detail. FIG. 5 is a diagram showing the configuration of the priority control section 22 in the present exemplary embodiment. The priority control section 22 is provided with a priority determining section 70, a priority table 71, a packet buffer 72, queues 73-1 to 73-*n* and an arbitrating section 74.

The priority table 71 stores a packet priority 80 based on a packet kind 81 and the retransmission count 50. FIG. 6 is a diagram showing the configuration of the priority table 71 in the present exemplary embodiment. The packet priority 80 shows a priority level in packet transmission. The packet kind 81 shows whether the packet is the retransmission non-application packet 14, the encapsulated packet 30 or the acknowledge packet 31. When the packet kind 81 is the encapsulated packet 30, the retransmission count 50 is referred to determine the priority level.

The priority level when the packet kind 81 is the "acknowledge packet 31" is set to the maximum level. In processing the acknowledge packet 31 with the highest priority level, the discard rate of the acknowledge packet 31 can be minimized. The suppression of discard of the acknowledge packet 31 is the most effective in the restraint of the packet retransmission of plural times.

Also, when the packet kind 81 is the "encapsulated packet 30", as a value of the retransmission count 50 corresponding to the encapsulated packet 30 becomes large, the priority level becomes higher. The fact that the retransmission of the encapsulated packet 30 is repeated means that the arrival of the communication data at a destination is delayed for the repeat. This degrades communication performance in view from the application. To suppress such degradation of communication performance, it is desirable to process the encapsulated packet 30 with a larger value of the retransmission count 50 than the encapsulated packet 30 with a smaller value of the retransmission count 50.

In FIG. 6, the upper limit L of the retransmission count 50 is set to "10". It should be noted that this is an example and the present invention is not limited to this example. Also, when the packet kind 81 is the retransmission non-application packet 14 or the acknowledge packet 31, the retransmission count 50 is not referred to. This is because these packets 6 are not targets of the retransmission.

It should be noted that the same level of the packet priority 80 may be allocated to the plurality of sets of the packet kind 81 and the retransmission count 50. Also, in the example of FIG. 6, as the value of the packet priority 80 becomes smaller, the priority level becomes higher. However, the present invention is never limited to this relation. As the value of the packet priority 80 becomes larger, the priority level may become higher.

The priority determining section 70 receives the encapsulated packet 30 from the transmitting section 20, the acknowledge packet 31 from the receiving section 21, and the retransmission non-application packet 14 from the upper layer processing section 2. When receiving the encapsulated packet 30 from the transmitting section 20, the priority determining section 70 extracts the retransmission count 50 from the encapsulated packet 30. Referring to the priority table 71 based on the extracted retransmission count 50 and the packet kind, the priority determining section 70 determines a level of packet priority 80 of the encapsulated packet 30. Specifically, the priority determining section 70 refers to the priority table 71 and determines the level of the packet priority 80 corresponding to the retransmission count 50 which is extracted from the encapsulated packet 30, for the packet kind 81 of the encapsulated packet 30. The priority determining section 70 outputs the packet priority 80 and the encapsulated packet 30 to the packet buffer 72.

Also, when receiving the acknowledge packet 31 from the receiving section 21, the priority determining section 70 refers to the priority table 71 based on the packet kind 81, to determine a level of the packet priority 80 corresponding to the acknowledge packet 31. The priority determining section 70 outputs the level of the packet priority 80 and the acknowledge packet 31 to the packet buffer 72.

Moreover, when receiving the retransmission non-application packet 14 from the upper layer processing section 2, the priority determining section 70 refers to the priority table 71 based on the packet kind 81, to determine a level of the packet priority 80 corresponding to the retransmission non-application packet 14. The priority determining section 70 outputs the level of the packet priority 80 and the retransmission non-application packet 14 to the packet buffer 72.

Next, the packet buffer 72 temporarily stores the retransmission non-application packet 14, the encapsulated packet 30 and the acknowledge packet 31. The packet buffer 72 is provided with n (n is a natural number) physical or logical queues 73-1 to 73-n. It should be noted that if not especially specified, the description is made as the queues 73. The number n of queues 73 is equal to the number of kinds of the packet priority 80 which is set to the priority table 71, and each of the queues 73 corresponds to the packet priority 80. Therefore, the above-mentioned priority control section 22 stores the retransmission non-application packet 14, the encapsulated packet 30 and the acknowledge packet 31 in corresponding queues 73-x of the packet buffer 72 based on the value x (x is a natural number, $1 \cdot x \cdot n$) of the packet priority 80 which is specified by the priority table 71.

Next, the arbitrating section 74 outputs the retransmission non-application packet 14, the encapsulated packet 30 and the acknowledge packet 31 to the lower layer processing section 3. The arbitrating section 74 acquires the retransmission non-application packet 14, the encapsulated packet 30, and the acknowledge packet 31 which are stored in the packet buffer 72 in the order of higher level of the packet priority 80, and outputs the packets to the lower layer processing section 3.

(Operation)

Next, the operation of the packet retransmission control apparatus in the present exemplary embodiment will be described.

Figure 7A:
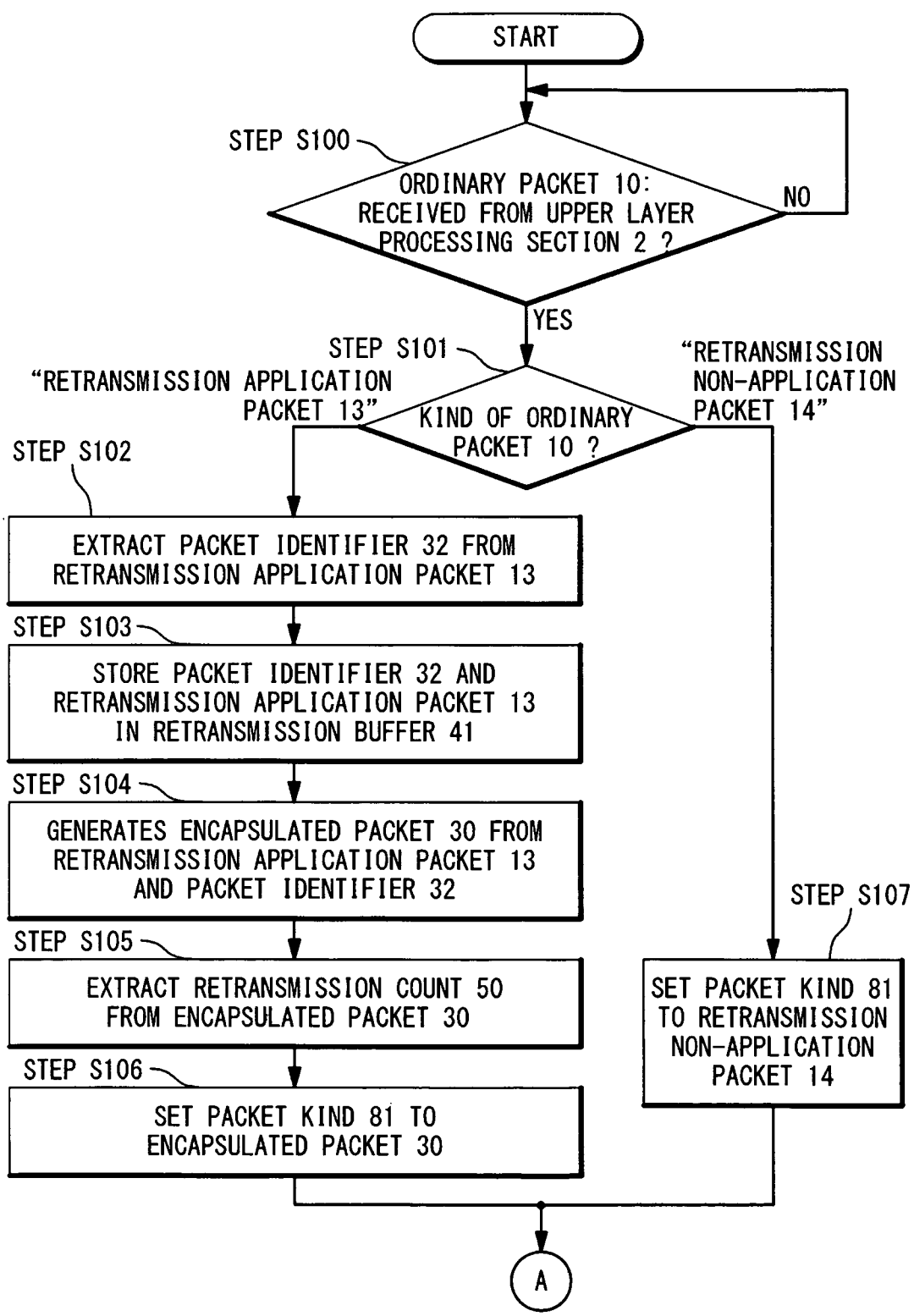
FIG. 7A is a part of a flow chart showing a transmission operation of an ordinary packet by a packet retransmission control apparatus in the first exemplary embodiment of the present invention.
Figure 7B:
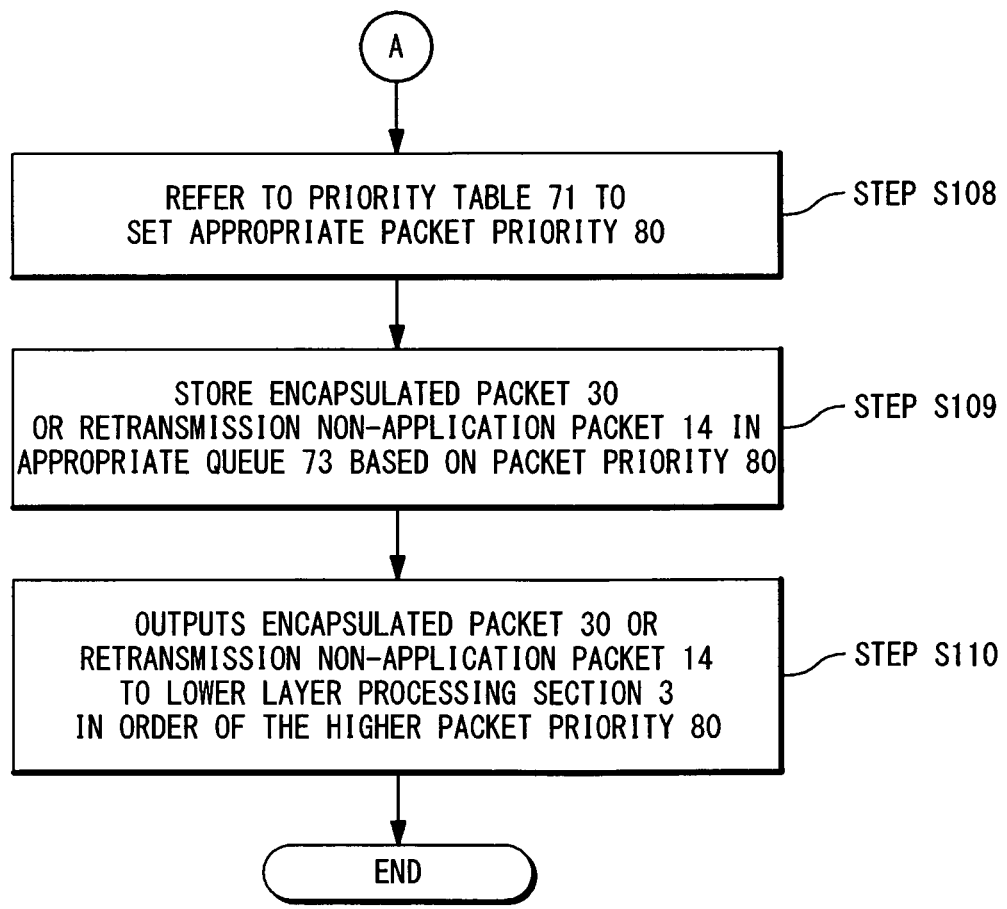
FIG. 7B is the other part of the flow chart showing the transmission operation of an ordinary packet by a packet retransmission control apparatus in the first exemplary embodiment of the present invention.

First, the transmission operation of the packet 10 by the retransmission control unit 1 in the present exemplary embodiment will be described. FIG. 7A and FIG. 7B show a flow chart of the transmission operation of the ordinary packet 10 by the retransmission control unit 1 in the present exemplary embodiment.

First, the retransmission control unit 1 determines whether or not the ordinary packet 10 is received from the upper layer processing section 2 (step S100). When the ordinary packet 10 is not received (No at step S100), this step is repeated until the ordinary packet 10 is received.

When the ordinary packet 10 is received (Yes at step S100), the retransmission control unit 1 determines the packet kind 81 of the received ordinary packet 10 (step S101). When the packet kind 81 shows the retransmission application packet 13, the transmitting section 20 receives the retransmission application packet 13.

On the other hand, when the packet kind 81 shows the retransmission non-application packet 13, the priority control section 22 receives the received ordinary packet 10 as the retransmission non-application packet 14. The priority determining section 70 of the priority control section 22 (step S107) sets the packet kind 81 showing "the retransmission non-application packet" to the received packet. After that, the control flow advances to step S108.

The identifier extracting section 40 of the transmitting section 20 extracts the packet identifier 32 from the retransmission application packet 13 (step S102). The identifier extracting section 40 stores in the retransmission buffer 41 at the same time as outputting the packet identifier 32 and the retransmission application packet 13 to the encapsulating section 42 (step S103). At this time, the transmitting section 20 generates a new queue entry 60 in the retransmission buffer 41 based on the retransmission application packet 13 and the packet identifier 32. Also, the transmitting section 20 initializes the retransmission count 50 in the queue entry 60 to "1".

Also, the encapsulating section 42 of the transmitting section 20 generates the encapsulated packet 30 from the retransmission application packet 13 and the packet identifier 32 (step S104). The encapsulating section 42 sets the retransmission count 50 contained in the encapsulated packet 30 to "0". The encapsulating section 42 outputs the encapsulated packet 30 to the priority control section 22. It should be noted that step S103 and step S104 may be executed in parallel.

When receiving the encapsulated packet 30 from the encapsulating section 42, the priority determining section 70 of the priority control section 22 extracts the retransmission count 50 from the encapsulated packet 30 (step S105). Also, the priority determining section 70 sets the packet kind 81 of the encapsulated packet 30 to "the encapsulated packet 30" (step S106). After that, the control flow advances to step S108.

The priority determining section 70 refers to the priority table 71 based on the packet kind 81 and the retransmission count 50, to determine levels of the packet priority 80 of the encapsulated packet 30, the retransmission non-application packet 14, and the acknowledge packet 31 (step S108). The priority control section 22 stores the acknowledge packet 31, the retransmission non-application packet 14, and the encapsulated packet 30 in the queues 73 of the packet buffer 72 corresponding to the determined levels of the packet priority 80 (step S109).

The arbitrating section 74 reads the encapsulated packet 30, the retransmission non-application packet 14 and the acknowledge packet from the packet buffer 72 31 in order of the higher level of the packet priority 80. The arbitrating section 74 outputs the read packet to the lower layer processing section 3 (step S110). Thus, the control flow ends.

Figure 8A:
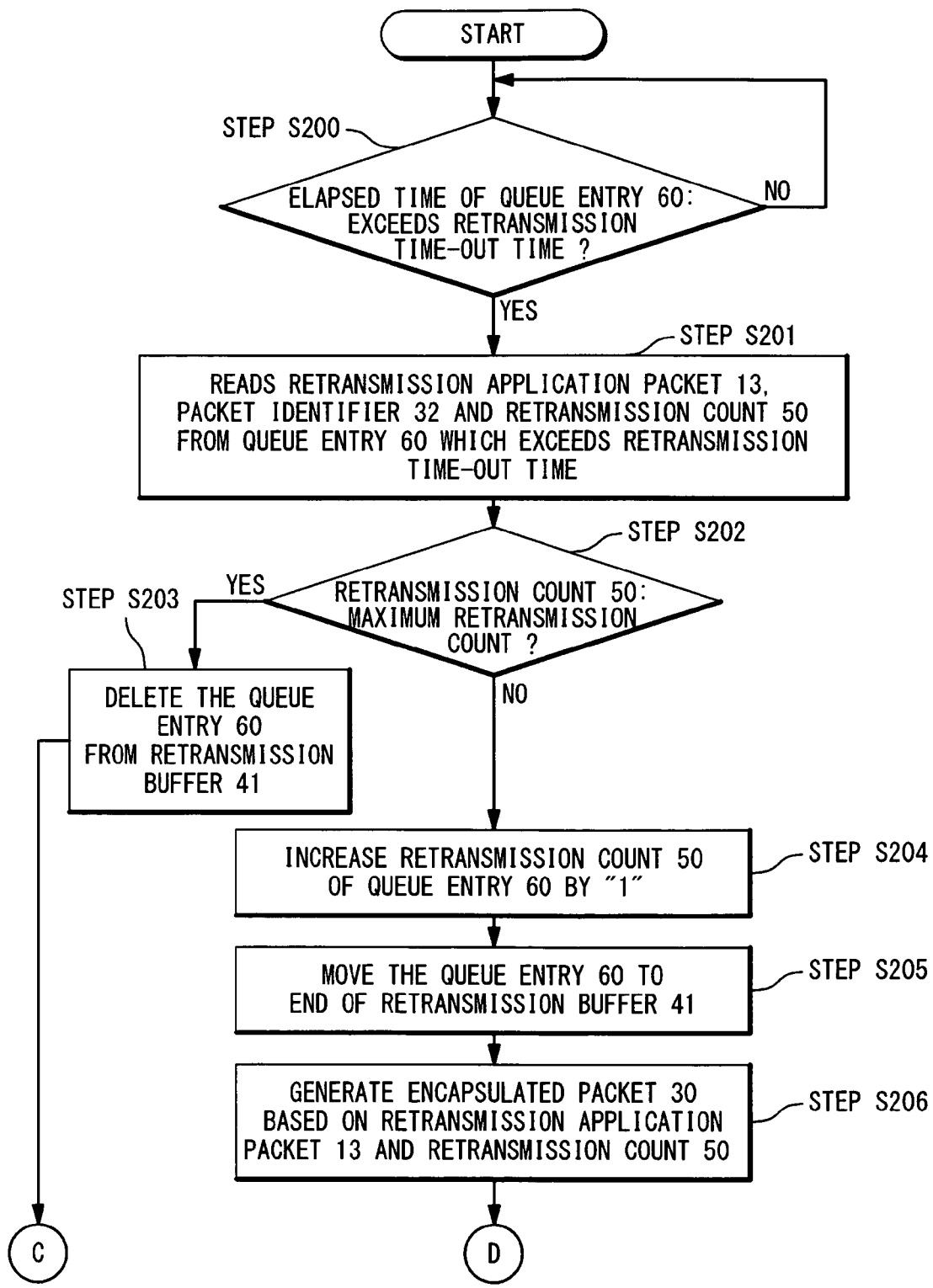
FIG. 8A is a part of a flow chart showing a retransmission operation of a retransmission application packet by the packet retransmission control apparatus in the first exemplary embodiment of the present invention.

Next, the operation in case of the retransmission of the retransmission application packet 13 by the retransmission control unit 1 in the present exemplary embodiment will be described. FIG. 8A and FIG. 8B show a flow chart of the operation in case of the retransmission of the retransmission application packet 13 by the retransmission control unit 1 in the present exemplary embodiment.

First, the transmitting section 20 determines whether or not the queue entry 60, elapsed time of which from the registration exceeds the retransmission time-out time exist in the retransmission buffer 41 (step S200). When the queue entry 60 that the elapsed time exceeds the retransmission time-out time does not exist (No at step S200), this step is repeated.

On the other hand, when the queue entry 60 that the elapsed time exceeds the retransmission time-out time exists (Yes at step S200), the transmitting section 20 reads the retransmission application packet 13, the packet identifier 32 and the retransmission count 50 from the queue entry 60 (step S201).

The transmitting section 20 determines whether or not the read retransmission count 50 reaches the predetermined upper limit L (step S202). When the retransmission count 50 reaches the upper limit L (Yes at step S202), the transmitting section 20 deletes the read queue entry 60 from the retransmission buffer 41 (step S203). In this case, the control flow ends.

When the retransmission count 50 does not reach the upper limit L (No at step S202), the transmitting section 20 increases the retransmission count 50 by "1" (step S204). Then, the transmitting section 20 moves the queue entry 60 to the end in the retransmission buffer 41 (step S205). Thus, the queue entry 60 is again dealt with the retransmission processing.

The encapsulating section 42 of the transmitting section 20 generates the encapsulated packet 30 based on the read retransmission application packet 13, the packet identifier 32 and the retransmission count 50 (step S206). The encapsulating section 42 outputs the encapsulated packet 30 to the priority control section 22.

When receiving the encapsulated packet 30 from the encapsulating section 42, the priority determining section 70 of the priority control section 22 extracts the retransmission count 50 from the encapsulated packet 30 (step S207). Also, the priority determining section 70 sets the packet kind 81 of the encapsulated packet 30 to "the encapsulated packet 30" (step S208).

The priority determining section 70 refers to the priority table 71 and determines a level of the packet priority 80 of the encapsulated packet 30 (step S209). The priority determining section 70 refers to the priority table 71 and determines the packet priority 80 corresponding to the retransmission count 50 and the packet kind 81 of the encapsulated packet 30 which is extracted at step S207. The priority control section 22 stores the encapsulated packet 30 in the queue 73 of the packet buffer 72 corresponding to the determined packet priority 80 (step S210).

The arbitrating section 74 reads the encapsulated packet 30 from the packet buffer 72 in order of the higher level of the packet priority 80. The arbitrating section 74 outputs the encapsulated packet 30 to the lower layer processing section 3 (step S211). Thus, the control flow ends.

Figure 9A:
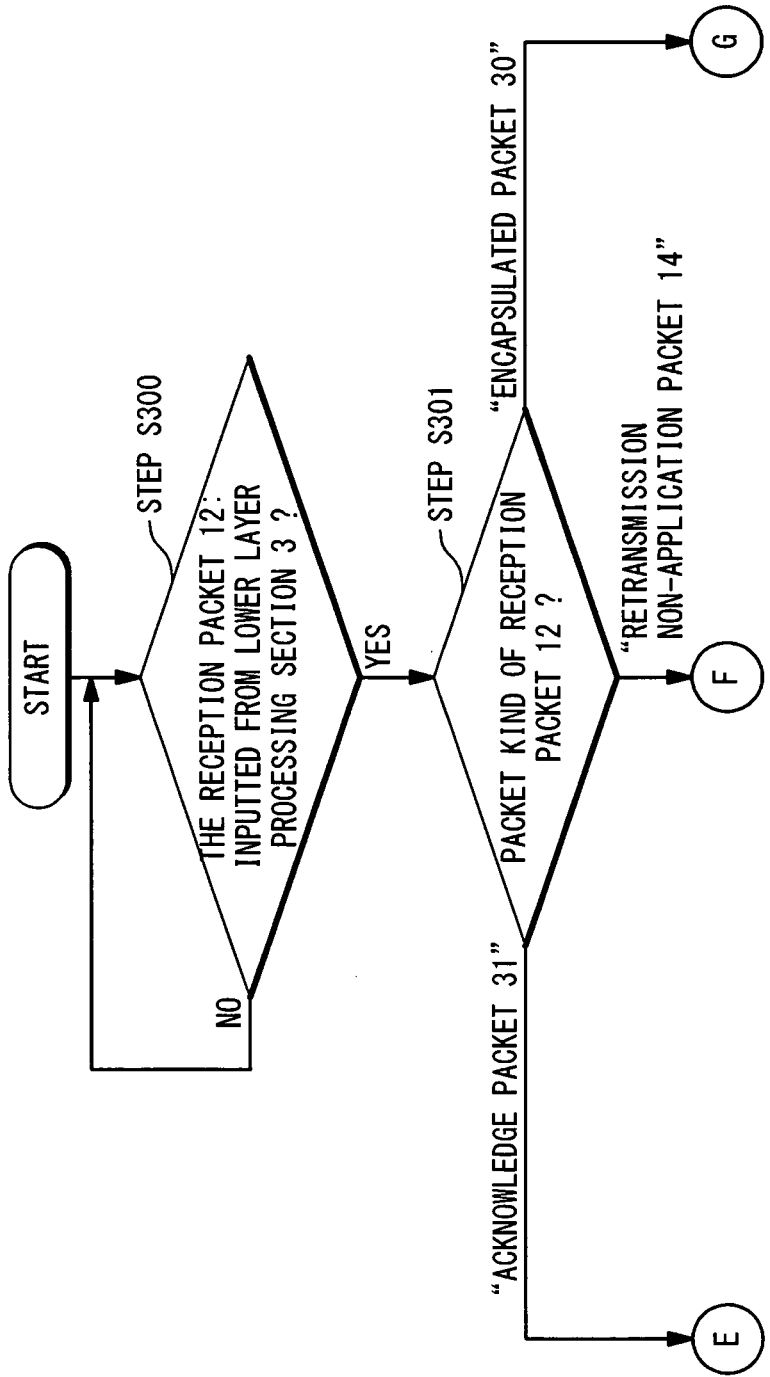
FIG. 9A is a part of a flow chart showing a reception operation of a reception packet by the packet retransmission control apparatus in the first exemplary embodiment of the present invention.
Figure 9B:
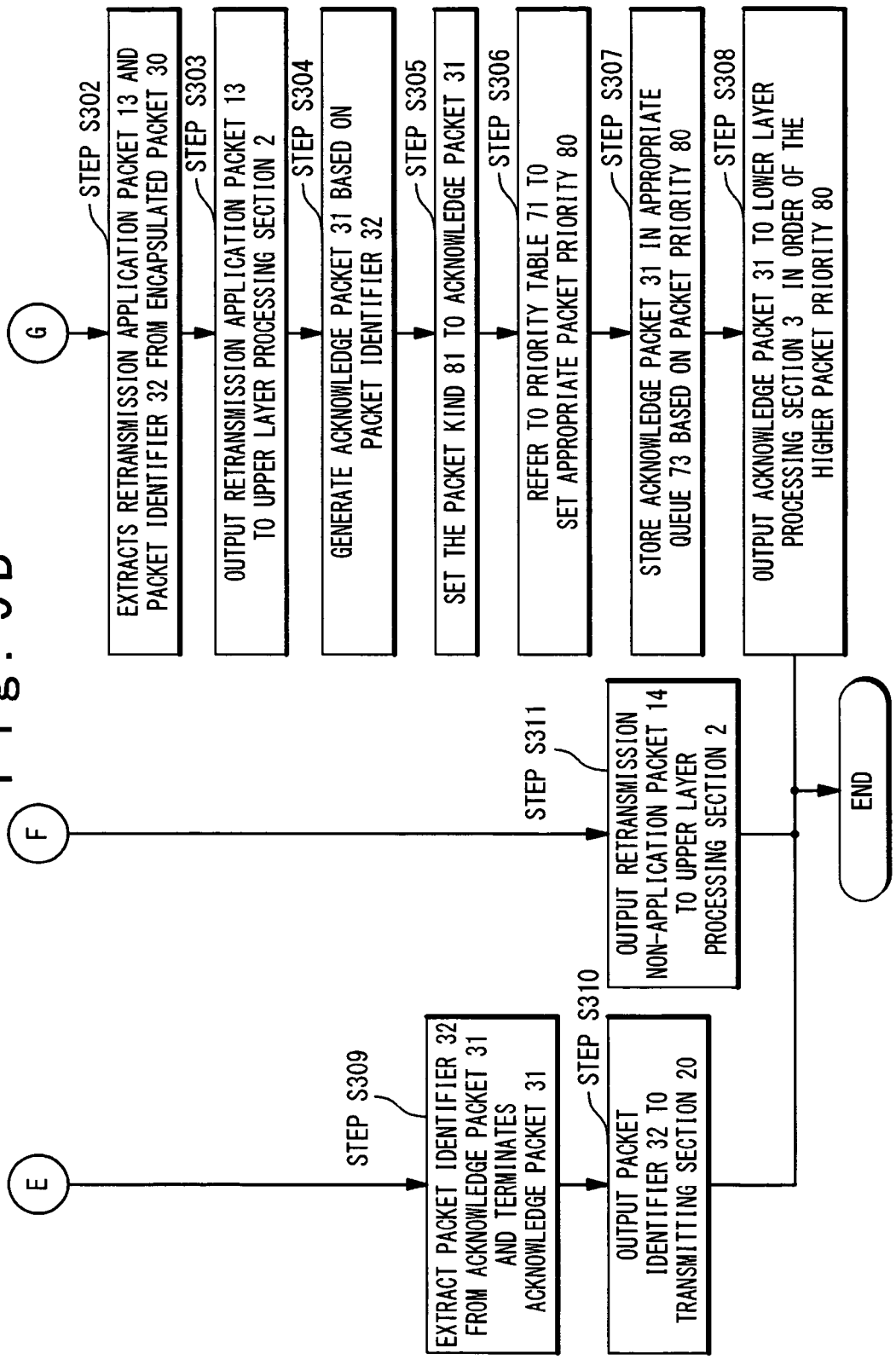
FIG. 9B is the other part of the flow chart showing operation of the reception packet by the packet retransmission control apparatus in the first exemplary embodiment of the present invention.

Next, the operation in case of the reception of the packet 12 by the retransmission control unit 1 in the present exemplary embodiment will be described. FIG. 9A and FIG. 9B show a flow chart of the operation in case of the reception of the reception packet 12 by the retransmission control unit 1 in the present exemplary embodiment.

First, the retransmission control unit 1 determines whether or not it has received the reception packet 12 from the lower layer processing section 3 (step S300). When not receiving the reception packet 12 (No at step S300), this step is repeated until the retransmission control unit 1 receives the reception packet 12. On the other hand, when receiving the reception packet 12 (Yes at step S300), the receiving section 21 determines the packet kind 81 of the reception packet 12 (step S301).

When the packet kind 81 of the reception packet 12 is "the encapsulated packet 30", the receiving section 21 extracts the retransmission application packet 13 and the packet identifier 32 from the encapsulated packet 30 (step S302) and outputs the retransmission application packet 13 to the upper layer processing section 2 (step S303). Also, the receiving section 21 generates the acknowledge packet 31 based on the extracted retransmission application packet 13 and packet identifier 32 (step S304). The receiving section 21 outputs the acknowledge packet 31 to the priority control section 22. It should be noted that the steps S303 and S304 may be executed in parallel.

The priority determining section 70 of the priority control section 22 receives the acknowledge packet 31 from the receiving section 21. The priority determining section 70 sets the packet kind 81 to the acknowledge packet 31 with "the acknowledge packet 31" (step S305). The priority determining section 70 refers to the priority table 71 based on the packet kind 81, and specifies the packet priority 80 of the acknowledge packet 31 (step S306).

The priority control section 22 stores the acknowledge packet 31 in the queue 73 of the packet buffer 72 corresponding to the determined level of the packet priority 80 (step S307). The arbitrating section 74 reads the acknowledge packet 31 from the packet buffer 72 in order of the higher level of the packet priority 80. The arbitrating section 74 outputs the acknowledge packet 31 to the lower layer processing section 3 (step S308). Thus, the control flow ends.

Also, at s301 step, when the packet kind 81 of the reception packet 12 is "the acknowledge packet 31", the receiving section 21 extracts the packet identifier 32 from the acknowledge packet 31 and terminates the acknowledge packet 31 (step S309). The receiving section 21 outputs the packet identifier 32 to the transmitting section 20 (step S310). When receiving the packet identifier 32 from the receiving section 21, the transmitting section 20 deletes the queue entry 60 corresponding to the packet identifier 32. Thus, the control flow ends.

Moreover, at s301 step, when the packet kind 81 of the reception packet 12 is "the retransmission non-application packet 14", the receiving section 21 outputs the retransmission non-application packet 14 to the upper layer processing section 2 (step S311). Thus, the control flow ends.

The operation of the packet retransmission control apparatus of the present exemplary embodiment has been described above.

Next, referring to FIG. 10, a specific example of the priority control processing of the priority control section 22 in the present exemplary embodiment will be described. FIG. 10 is a diagram showing a specific example of the priority control processing of the priority control section 22 in the present exemplary embodiment. It should be noted that in FIG. 10, supporting that all the packets 6 which are inputted to the priority control section 22 are the encapsulated packet 30, the description is made.

The priority determining section 70 determines a level of the packet priority 80 from the priority table 71 based on the retransmission count 50 which is contained in the encapsulated packet 30 inputted from the transmitting section 20. The encapsulated packet 30 set with the level of the packet priority 80 is stored in the queue 73 of the packet buffer 72 as a transmission packet 11. As mentioned above, the levels of the packet priority 80 recorded to the priority table 71 correspond to the queues 73-1 to 73-N in the packet buffer 72. The transmission packet 11 is stored in one of the queues 73-1 to 73-N which corresponds to the level of the packet priority 80 of the transmission packet 11.

The arbitrating section 74 searches the packet buffer 72. The arbitrating section 74 first selects the queue 73-$x$ (1·$x$·n) assigned with the highest level of the packet priority 80 and outputs the encapsulated packets 30 in the queue 73-$x$ to the lower layer processing section 3. Also, after this, the arbitrating section 74 selects the queue 73-$x$ in the higher order of the packet priority 80, and outputs the encapsulated packets 30 in the selected queue 73-$x$ to the lower layer processing section 3. Then, after outputting the encapsulated packets 30 in the queue 73-$x$ assigned with the lowest level of the packet priority 80, the arbitrating section 74 returns to the search operation of the queue 73-$x$ assigned with the highest level of the packet priority 80 once again. The arbitrating section 74 repeats such an operation and outputs the transmission packets 11 to the lower layer processing section 3.

It should be noted that in the specific example of FIG. 10, the arbitrating section 74 refers to the queue 73-$x$ in an even probability in an order of the higher level of the packet priority 80. However, the present invention is not limit to this operation. For example, parameters such as an average of the retransmission count 50 and the reception frequency for every packet kind 81 are collected, and the search frequency of the queue 73 corresponding to the packet priority 80 may be set high based on these parameters. Or, the search frequency of the queue 73 corresponding to the packet priority 80 may be set low.

The packet retransmission control apparatus in the present exemplary embodiment has been described. The retransmission control unit 1 assigns a level of the packet priority 80 based on the packet kind 81. The retransmission control unit 1 assigns a higher level of the packet priority to the acknowledge packet 31, the retransmission application packet 13, and the retransmission non-application packet 14 in an order for a priority control. Also, with respect to the retransmission application packet 13, the retransmission control unit 1 assigns the higher level of the packet priority for the priority control as the retransmission count 50 becomes larger. Therefore, the retransmission control unit 1 transmits the acknowledge packet 31 with the higher level of the packet priority than the retransmission application packet 13 and the retransmission non-application packet 14. Also, the retransmission application packet 13 is transmitted with the higher level of the packet priority than the retransmission non-application packet 14. Also, the retransmission control unit 1 can transmit the retransmission application packet 13 with the higher retransmission count 50 with a higher level of the packet priority. Thus, the retransmission control unit 1 restrains the generation of multiple retransmission due to discard of the retransmission application packet 13 and the acknowledge packet 31, and communication performance can be improved in a state that the load of the network 4 is in a high condition.

Here, FIG. 11 is a diagram showing the configuration example when the priority control section 22 in the present exemplary embodiment is applied to a network relay unit. In this way, it is possible to apply the priority control section 22 to the network relay unit such as the switch.

Referring to FIG. 11, the priority control switch 103 is interposed between a plurality of transmission terminals 100 and a plurality of reception terminals 101. The priority control switch 103 is provided with a switch 102 and a plurality of priority control sections 22. The switch 102 is connected to the plurality of priority control sections 22. The plurality of priority control sections 22 are provided for output ports of the switch 102, respectively. Also, the switch 102 is connected with the plurality of transmission terminals 100. The plurality of priority control sections 22 are connected with the plurality of reception terminals 101, respectively.

It should be noted that there is no limitation of the number of the transmission terminals 100 or the reception terminals, which are connected with the switch 102. Also, there is no limitation in the number of the priority control switches 103 which are interposed between the transmission terminals 100 and the reception terminals 101.

The priority control section 22 in FIG. 11 operates in the same way as the priority control section 22 described with reference to FIG. 5, excluding a relation of different input/output connection. In the configuration example of FIG. 11, the priority control section 22 receives all of the retransmission non-application packet 14, the encapsulated packet 30 and the acknowledge packets 31 from the switch 102. Then, the priority control section 22 outputs the transmission packet 11 to corresponding reception terminal 101.

Figure 12:
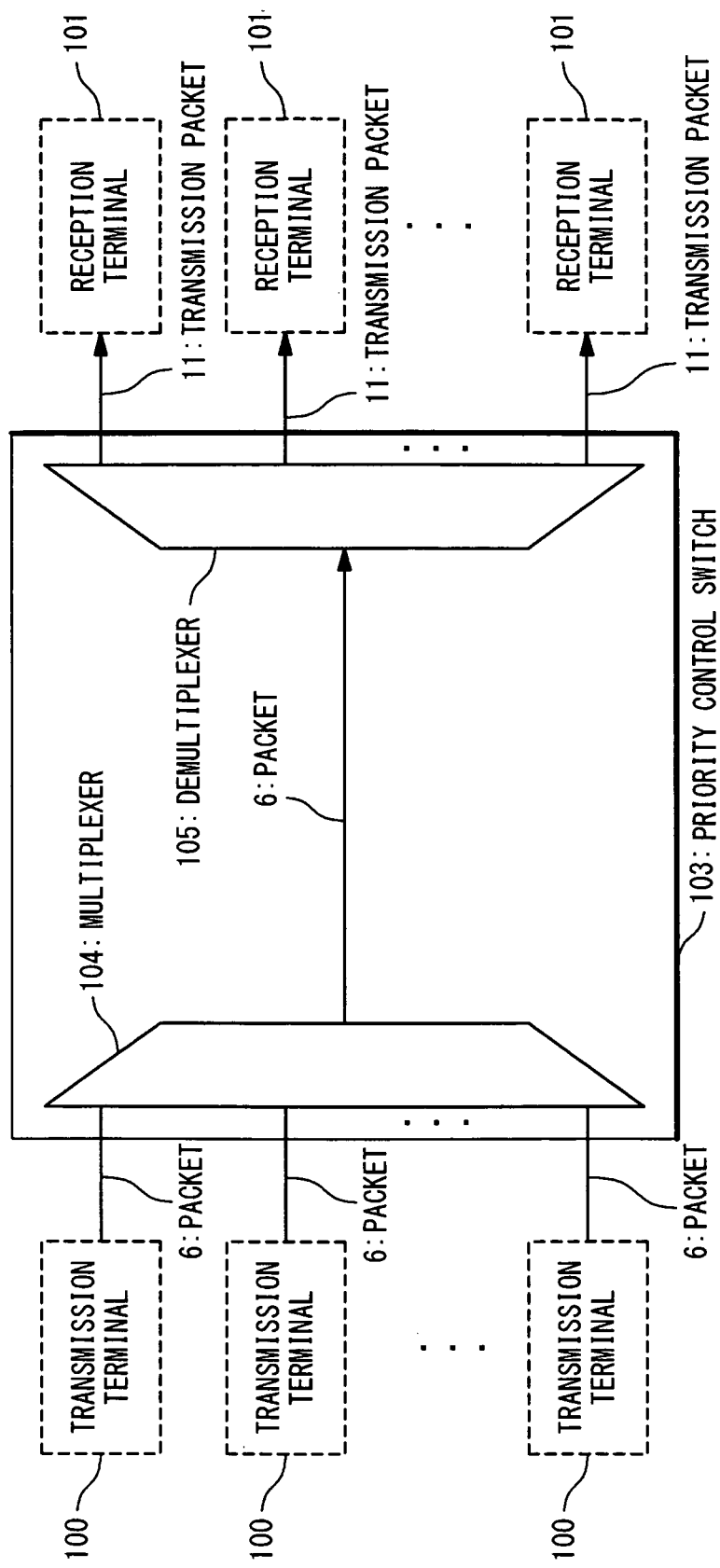
FIG. 12 is a diagram showing a configuration example when the priority control section according to the first exemplary embodiment of the present invention is applied to a switch.

Moreover, the similar effect can be obtained by installing the priority control section 22 in the switch 102. FIG. 12 is a diagram showing the configuration example of the switch 102 in the conventional technique to which the priority control section 22 in the present exemplary embodiment is applied.

The switch 102 aggregates the plurality of the packets 6 received from the transmission terminals 100 by the multiplexer 104, and outputs the transmission packets 11 to the reception terminals 101 by a demultiplexer 105. Thus, the switch 102 can communicate at a high rate.

FIG. 13 is a diagram showing a configuration example of the network relay unit to which the priority control section 22 in the present exemplary embodiment into switch 102 is applied. Referring to FIG. 13, the priority control section 22 is provided between the multiplexer 104 and the demultiplexer 105 in the switch 102. In the configuration example shown in FIG. 13, while attaining the same effect as in the configuration example shown in FIG. 11, the number of the priority control sections 22 can be reduced, compared with the configuration example shown in FIG. 11.

In this way, by introducing the priority control switch 103 applied with the priority control section 22, the priority control of the packets 6 can be performed in the network relay unit in the network 4, as well as communication unit 5. Therefore, the restraint effect of retransmission of the packet 6 can be more improved in the network 4, and the communication performance can be further improved.

As described above, the present invention has been described with reference to the exemplary embodiments. However, the present invention is not limited to the above exemplary embodiments. Various modifications can be made by a person in the art within the scope of the present invention.

This patent application claims a priority based on Japanese Patent Application No. 2010-115140. The disclosure thereof is incorporated herein by reference.

What is claimed is:

1. A packet retransmission control apparatus, comprising:
a priority determining section configured to set a packet kind to each of transmission packets, and to determine a priority level based on said packet kind;
a packet buffer comprising a plurality of queues respectively assigned with priority levels, and configured to store a transmission packet of the transmission packets in one of said plurality of queues which is determined based on said priority level of the transmission packet; and
an arbitrating section configured to output the transmission packets stored in said plurality of queues of said packet buffer to a lower layer in an order of a higher priority level,
wherein said priority determining section determines the higher priority level for the transmission packet when a retransmission count of the transmission packet is more than in a case where the transmission packet includes said packet kind of a retransmission application packet,
wherein the packet retransmission control apparatus receives a packet, which includes a packet before a retransmission control and generated on an upper network layer, encapsulates the packet, and outputs the encapsulated packet to each of a physical layer and a link layer, and
wherein said arbitrating section aggregates a reception frequency for every said packet kind, and changes a reference frequency of each of said plurality of queues based on said reception frequency.

2. The packet retransmission control apparatus according to claim 1, wherein said packet kind is used to identify the retransmission application packet requiring a retransmission control, a retransmission non-application packet not requiring the retransmission control, and an acknowledge packet to said retransmission application packet,
wherein said priority determining section assigns a highest priority level to the transmission packet including said packet kind of said acknowledge packet, and
wherein said acknowledge packet includes a packet for recognizing that a transmitted packet is reached safely.

3. The packet retransmission control apparatus according to claim 1, further comprising:
a priority table in which a set of said packet kind and said priority level is stored,
wherein said priority determining section refers to said priority table based on said packet kind of the transmission packet to determine said priority level of the transmission packet.

4. The packet retransmission control apparatus according to claim 1, further comprising:
a transmitting section configured to store a payload and the retransmission count of the transmission packet including said packet kind of said retransmission application packet, and to generate said encapsulated packet from said retransmission count and the payload based on a packet identifier of the transmission packet,
wherein said priority determining section refers to said encapsulated packet and acquires said retransmission count.

5. The packet retransmission control apparatus according to claim 1, wherein the priority level is further determined based on the retransmission count.

6. The packet retransmission control apparatus according to claim 1, wherein said priority determining section determines the higher priority level such that a packet with a higher drop possibility has the higher priority level.

7. The packet retransmission control apparatus according to claim 1, wherein the upper network layer comprises one of a transport layer and an application layer.

8. The packet retransmission control apparatus according to claim 1, further comprising:
a transmitting section that generates the encapsulated packet,
wherein, when the encapsulated packet contains same data as the transmission packet, the transmitting section generates the encapsulated packet without adding data.

* * * * *